Jan. 20, 1948.     L. PACHNER     2,434,861
COMBINATION APPLICATOR AND LINE DRESSING CONTAINER
Filed April 11, 1945     2 Sheets-Sheet 1

INVENTOR.
LEO PACHNER

BY *Victor J. Evans & Co.*
ATTORNEYS

Jan. 20, 1948. L. PACHNER 2,434,861
COMBINATION APPLICATOR AND LINE DRESSING CONTAINER
Filed April 11, 1945 2 Sheets-Sheet 2
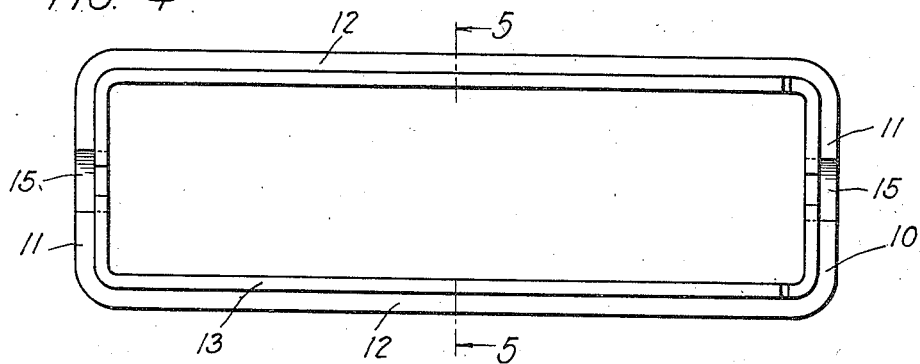
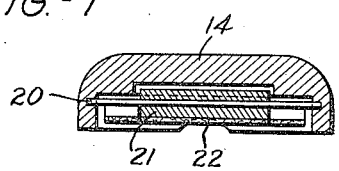
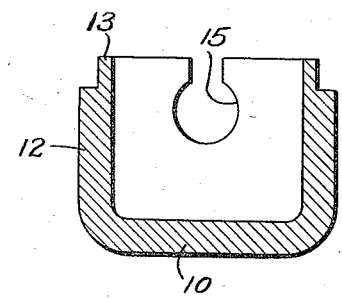
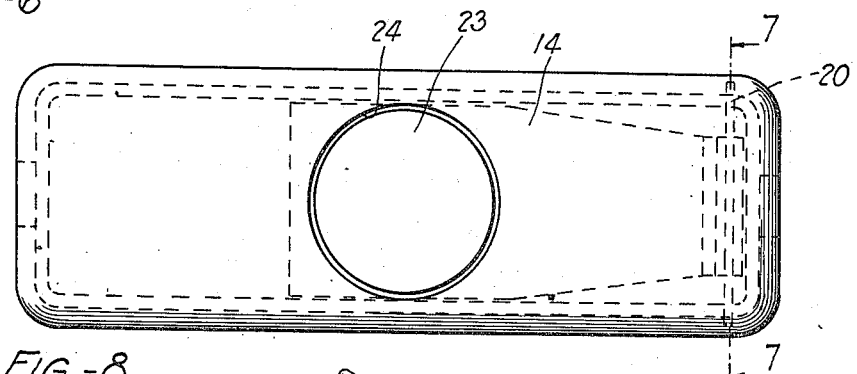
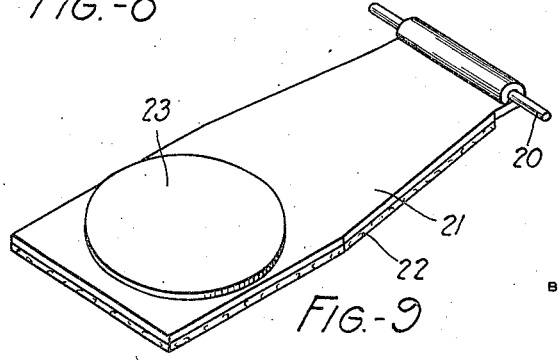
INVENTOR.
LEO PACHNER
BY Victor J. Evans & Co.
ATTORNEYS Patented Jan. 20, 1948

2,434,861

UNITED STATES PATENT OFFICE 2,434,861

COMBINATION APPLICATOR AND LINE DRESSING CONTAINER

Leo Pachner, Chicago, Ill.

Application April 11, 1945, Serial No. 587,800

3 Claims. (Cl. 91—62.5)

The invention relates to a fishing line dressing compound container, and more especially to combination applicator and dressing container for fishermen's use.

The primary object of the invention is the provision of a device of this character, wherein a dressing compound for fishing lines can be stored or held and such compound applied to a fishing line, without requiring the removal of such line from the fishing pole or requiring the detachment of the lure, the device being of novel construction and is unique for immediate use thereof, thus eliminating lengthy interruption during fishing, as the line can be dressed with dispatch and ease.

Another object of the invention is the provision of a device of this character, wherein the line dressing is conserved and more readily handled, as it cannot soil the user in the application thereof to a fishing line, and is compact, thus allowing the easy carriage thereof on the person, and will more evenly apply the compound to the line for the dressing thereof.

A further object of the invention is the provision of a device of this character, which is simple in construction, thoroughly reliable and efficient in operation, readily and easily handled, strong, durable, handy for use at any place, can be conveniently carried and stored in the least possible space, eliminates waste of compound in the dressing of a fishing line, and inexpensive to manufacture.

With these and other objects in view, the invention consists in the feature of construction, combination and arrangement of parts as will be hereinafter more fully described, illustrated in the accompanying drawings, which show the preferred embodiment of the invention, and pointed out in the claims hereunto appended.

In the accompanying drawings:

Figure 4 is an inner face view of the body for the device.

Figure 5 is a sectional view taken in the line 5—5 of Figure 4 looking in the direction of the arrows.

Figure 6 is a plan view of the cover for the device.

Figure 7 is a sectional view taken on the line 7—7 of Figure 6 looking in the direction of the arrows.

Figure 8 is a perspective view of the presser blade of the device.

Similar reference characters indicate corresponding parts throughout the several views in the drawings.

Figure 1:
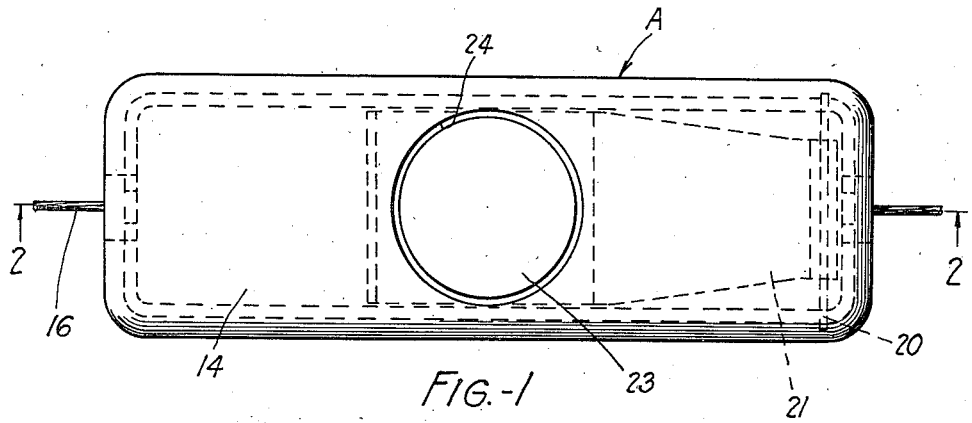
Figure 1 is a top plan view of the device constructed in accordance with the invention, and showing a fishing line to be dressed in association therewith.

Referring to the drawings in detail, A designates generally the combination line applicator and dresser in its entirety constructed in accordance with the invention. This applicator and dresser device A comprises an elongated or substantially rectangular shaped body 10 forming a container open at its top, its side and end walls 12 and 11, respectively, being continuous, and such body may be made from any suitable rigid material for strength and durability.

Figure 2:
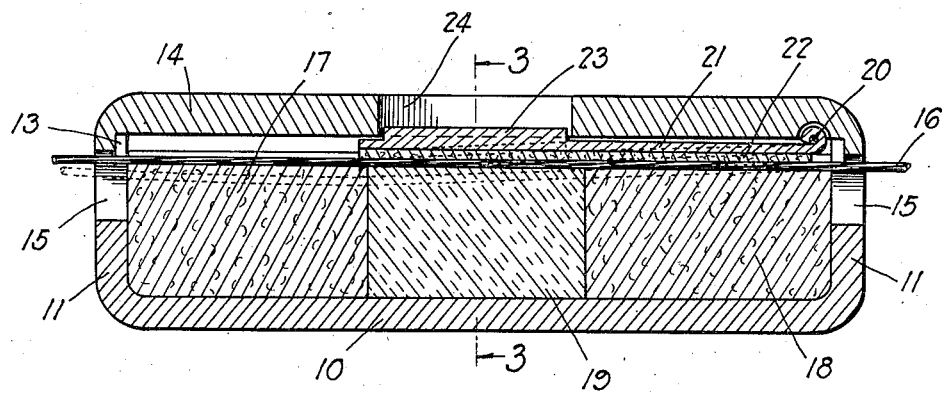
Figure 2 is a sectional view taken on the line 2—2 of Figure 1 looking in the direction of the arrows.
Figure 3:
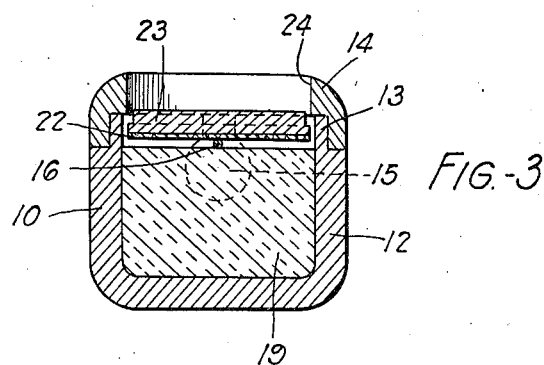
Figure 3 is a sectional view taken on the line 3—3 of Figure 2 looking in the direction of the arrows.

The edging of the open top of the body 10 following the sides and ends is formed with an inset rim 13 for interfitting with a removable cover or lid 14 therewith. The opposite ends or end walls 11 of the body 10 has centrally formed therein substantially key-hole shaped slots 15, which extend vertically, removed from the bottom of such body and open through the open top of the latter for the training of a fishing line therethrough, only a portion of the line being indicated at 16, which is adapted to be drawn across dressing blocks 17, 18 and 19, respectively, housed within the said body 10, as best seen in Figure 2 of the drawings, so that the compounds making up such blocks will be applied to the line for the dressing thereof, as the line is pulled upon from without the said container by hand or otherwise.

The cover or lid 14 near one end thereof at its inner side has a cross pintle 20 forming a pivot for a presser blade or tongue 21 which is adapted to swing toward and away from the blocks 17, 18 and 19, when the cover or lid is interfitted with the body 10, and on swinging toward such blocks through pressure, the line 16 will become coated with the compounds for the dressing thereof. The blade or tongue has a fibrous covering 22 on the face next to the line 16, while at the other side of such blade or tongue is a finger engaging button 23 which is exposed through a window 24, as provided in the cover or lid 14 for finger contact, so that pressure may be applied to such blade or tongue in the operation of the device manually.

In lieu of the outside blocks 17 and 19, felt pads can be used, with the compound make-up block 18 therebetween, and such pads may be used for dressing purposes when working the line 16 back and forth, for the disposition of the dressings compound thereon as before set forth.

The cover or lid 14 at opposite ends has provided therein suitable clearances for the line 16 and these match the slots 15 so as not to obstruct the movement of such line while dressing the same.

The device acts as a convenient applicator of the dressing to the line, and the dressing is more evenly applied than by hand. The device is cleanly to handle and it as well conserves the dressing material.

What is claimed is:

1. A device of the kind described, comprising a box-like container having an open top and adapted to confine a compound for exposure through the open top, key hole slots in the end walls of said container for passing a line therethrough, a cover removably fitting the open top, a presser blade movably fitted within the cover for pressing a line against the compound, the cover being provided with a window, and a finger engaging button on the blade and exposed through said window.

2. A line dressing applicator comprising a box-like container having an open top and adapted to confine a compound therein, a removable cover therefor, having a window opening therein, line receiving slots in the end walls of said container for guiding a line therethrough, felt pads confined within said container and disposed one on each side of said dressing compound, and a presser blade disposed within said cover whereby when pressure is manually exerted on said presser blade through said window opening, said presser blade will press a line against said dressing compound.

3. The device according to claim 2, wherein said presser blade is pivotedly anchored at one end to the side walls of said cover plate.

LEO PACHNER.

REFERENCES CITED

The following references are of record in the file of this patent:

UNITED STATES PATENTS

| Number | Name | Date |
|---|---|---|
| 239,009 | Wing | Mar. 15, 1881 |
| 1,667,902 | Osborne | May 1, 1928 |
| Re. 18,588 | Switzer | Sept. 6, 1932 |
| 686,461 | Keats | Mar. 12, 1901 |
| 1,800,253 | Heilweil | Apr. 14, 1931 |
| 2,375,971 | Windschauer | May 15, 1945 |